(12) United States Patent
Wakitani

(10) Patent No.: US 6,794,834 B2
(45) Date of Patent: Sep. 21, 2004

(54) ELECTRIC VEHICLE

(75) Inventor: Tsutomu Wakitani, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/299,150

(22) Filed: Nov. 19, 2002

(65) Prior Publication Data
US 2003/0094912 A1 May 22, 2003

(30) Foreign Application Priority Data
Nov. 20, 2001 (JP) ........................................ 2001-355328

(51) Int. Cl.$^7$ ................................................ H02P 7/80
(52) U.S. Cl. ............................. 318/55; 318/34; 318/59
(58) Field of Search ............................. 318/55, 34, 59; 150/65.1

(56) References Cited

U.S. PATENT DOCUMENTS 6,470,982 B2 * 10/2002 Sitarski et al. ............. 180/65.1
6,471,619 B2 * 10/2002 Nanri et al. .................. 477/52

FOREIGN PATENT DOCUMENTS

JP 0398404 4/1991

* cited by examiner

Primary Examiner—Karen Masih
(74) Attorney, Agent, or Firm—Adams & Wilks

(57) ABSTRACT

An electric vehicle driven by electric motors is provided. The vehicle is switched between forward travel, neutral and reverse travel by a directional speed lever which allows adjustment of the vehicle speed. When the directional speed lever passes through a neutral region at a high speed during forward travel of the vehicle, the vehicle is controlled to shift to normal reverse operation after a lapse of a predetermined period of time since the rotational speed of the electric motors becomes zero, thereby to avoid application of a heavy load to drive circuits for the electric motors.

1 Claim, 13 Drawing Sheets

| MODE NAME | DRIVING ELEMENTS | | | |
|---|---|---|---|---|
| | E | F | G | H |
| SHORT CIRCUIT BRAKE MODE | OFF | ON | OFF | ON |
| FORWARD MODE | ON | OFF | OFF | ON |
| REVERSE MODE | OFF | ON | ON | OFF |
| FREE MODE | OFF | OFF | OFF | OFF |

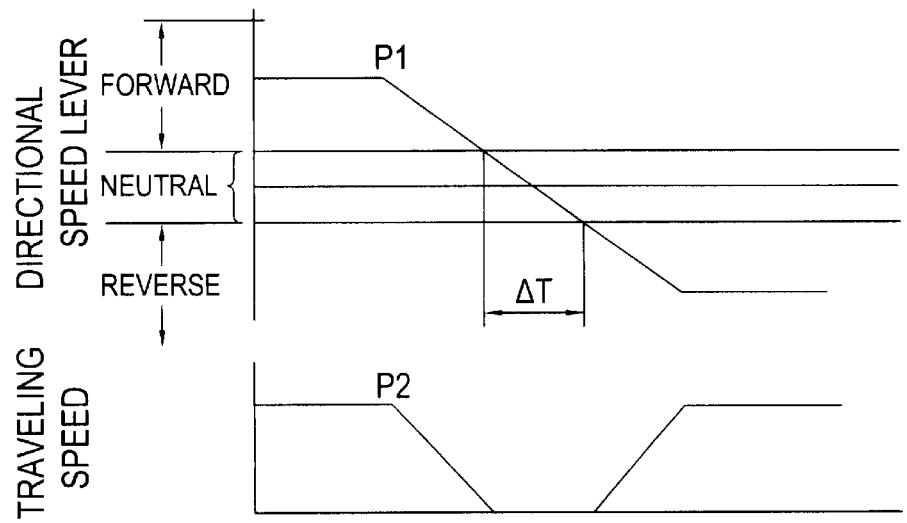
FIG. 7A
FIG. 7B
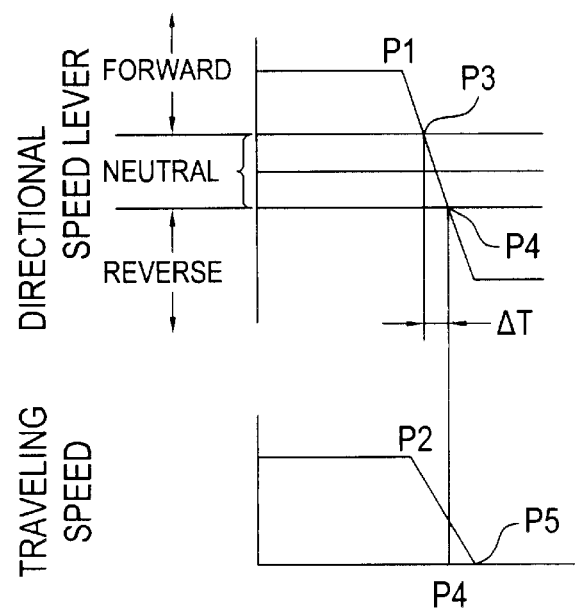
FIG. 7C
FIG. 7D

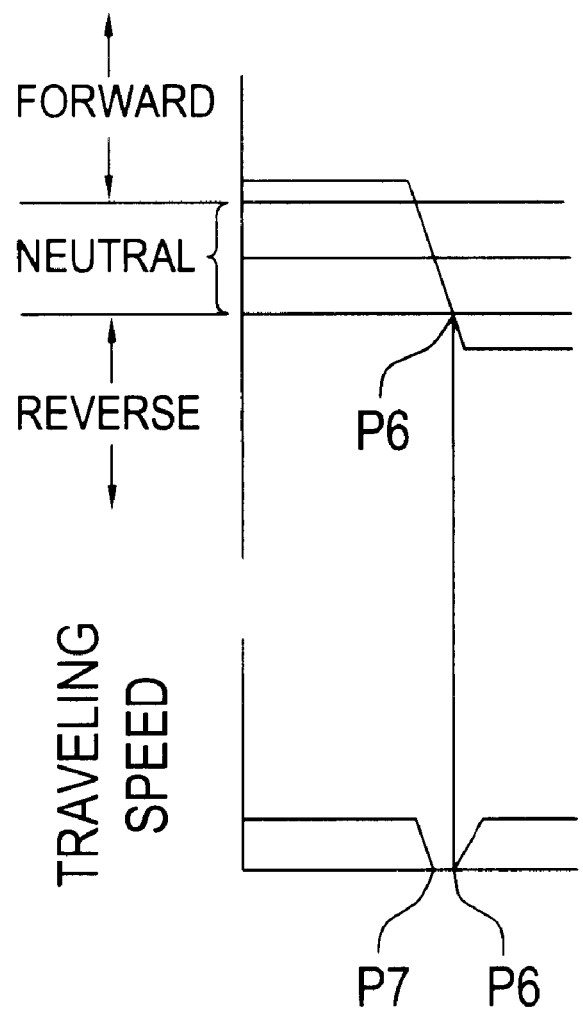

ELECTRIC VEHICLE

FIELD OF THE INVENTION

The present invention relates to an improvement in electric vehicles driven by electric motors, and more particularly, relates to control in switching an electric vehicle in forward travel to reverse travel.

BACKGROUND OF THE INVENTION

An electric vehicle of this kind is disclosed, for example, in Japanese Patent Laid-Open Publication No. HEI-3-98404 entitled "Compact Electric Vehicle." This electric vehicle includes an electric motor as a driving source, a drive circuit for the electric motor, an electromagnetic brake which releases the brake when being energized, a controller for controlling the electric motor and the electromagnetic brake, an acceleration setting volume, and a switch for switching between forward and reverse travel which allows a choice between forward or reverse travel and selection from among low, middle and high speeds.

In order to switch the direction of the electric vehicle from forward travel to reverse travel by the switch, the acceleration setting volume is returned to zero (zero motor rotation) before forward/reverse switching of the switch.

For some reason, however, the switch can be switched from forward travel to reverse travel without returning the acceleration setting volume to zero. This requires reversing the polarity of a motor drive circuit, resulting in a heavy load applied to switching elements constituting the motor drive circuit. It is thus necessary to use large-capacity switching elements endurable to the load.

Large-capacity switching elements inevitably cost high and have large size. This undesirably boosts the cost of the vehicle. An electric vehicle which allows reduction in load applied to a motor control circuit is thus desired.

SUMMARY OF THE INVENTION

According to the present invention, there is provided an electric vehicle driven by electric motors, which comprises: a directional speed member for instructing forward travel, neutral and reverse travel of the vehicle and adjusting the speed of the vehicle; the electric motors which operate in accordance with the operation of the directional speed member; and a controller for performing such control as, when two conditions are satisfied that time required for the directional speed member to pass through a neutral region is shorter than a threshold and the electric motors are still rotating in a forward direction at a point of time when the directional speed member is shifted from the neutral region to a reverse region, waiting until the speed of the electric motors becomes zero, and, after a lapse of time required for forward/reverse switching of the motor drive circuits since the speed of the electric motors reaches zero, shifting to normal reverse operation.

This invention thus first determines whether the directional speed member is switched at a "normal" speed or a "high speed." When the "high speed" switching is found, this invention waits until the speed of the electric motors becomes zero. This invention further waits until time required for forward/reverse switching of the motor circuits has elapsed and then performs reverse control. This allows reduction in electrical load applied to the motor circuits, allowing reduction in capacity of switching elements and reduction in cost of the circuits.

However, when the traveling speed of the vehicle is low, since switching of the directional speed member from forward travel to reverse travel at a high speed does not apply a large load to the motor drive circuits, the vehicle is operated during a period of time required for forward/reverse switching of the motor drive circuits, resulting in smoothness of the operation.

BRIEF DESCRIPTION OF THE DRAWINGS

Preferred embodiments of the present invention will be described in detail below, by way of example only, with reference to the accompanying drawings, in which:

FIGS. 7(a) to 7(f) are graphs illustrating the relationship between the directional speed lever of the present invention and traveling speed;

DETAILED DESCRIPTION OF THE PREFERRED EMBODIMENTS

The following description is merely exemplary in nature and is in no way intended to limit the invention, its application or uses.

Figure 1:
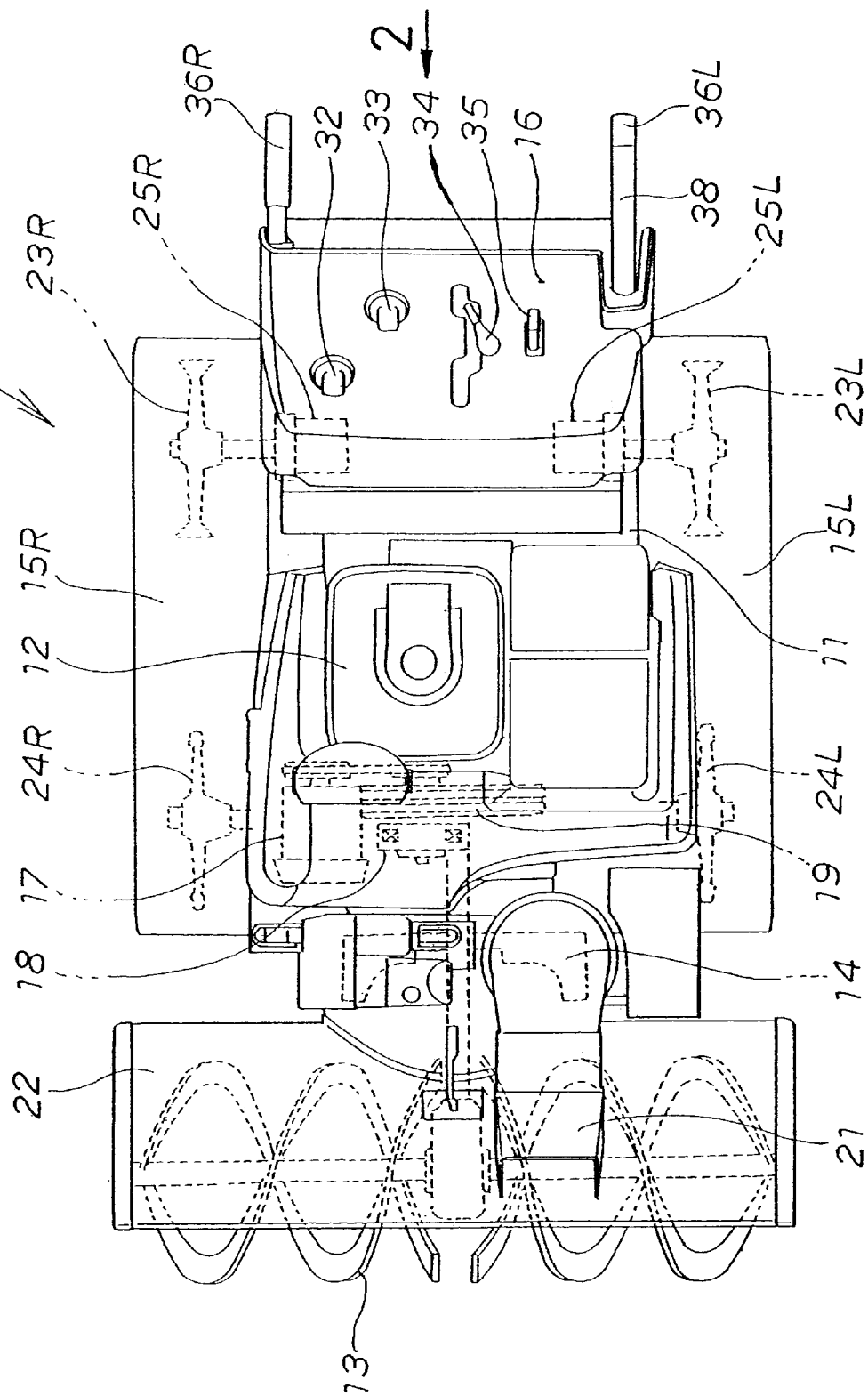
FIG. 1 is a plan view of a snow removal machine having an engine and electric motors, exemplifying an electric vehicle of the present invention.

Initial reference is made to FIG. 1 illustrating a snow removal machine 10 exemplifying an electric vehicle of the present invention. The snow removal machine 10 includes an engine 12 mounted on a machine body 11. The snow removal machine 10 further includes a working section consisting of an auger 13 and a blower 14 provided at the front of the machine body 11, crawlers 15L and 15R provided at the left and right of the machine body 11, and a control panel 16 provided at the rear of the machine body 11. The snow removal machine 10 is a walk-behind working machine to be led by an operator walking behind the control panel 16.

The engine 12 drives a generator 17 for rotation and drives the auger 13 and the blower 14 for rotation via an electromagnetic clutch 18 and a belt 19.

Electric power produced by the generator 17 is supplied to left and right electric motors 25L and 25R for driving left and right driving wheels 23L and 23R via a battery 43 (See FIG. 4) arranged below the control panel 16.

The auger 13 collects snow accumulating on the ground to the center. The blower 14 throws the snow collected by the auger 13 outside of the machine via a shooter 21. The auger 13 is covered by an auger housing 22.

The left crawler 15L is wound around and runs between the left driving wheel 23L and a left driven wheel 24L. In this embodiment, the left driving wheel 23L is rotated in forward and reverse directions by the left electric motor 25L. The right crawler 15R is wound around and runs between the right driving wheel 23R and a right driven wheel 24R. The right driving wheel 23R is rotated in forward and reverse directions by the right electric motor 25R.

In a conventional snow removal machine, a single engine (a gasoline engine or a diesel engine) drives both a working system (auger rotating system) and a driving system (crawler driving system). In this embodiment, the engine 12 drives the working system (auger rotating system), and the electric motors 25L and 25R drive the driving system (crawler driving system).

Electric motors are suitable for traveling speed control, turning control and forward and reverse travel switching control of the snow removal machine 10. A powerful internal combustion engine is suitable for powering the working system susceptible to rapid load change.

Figure 2:
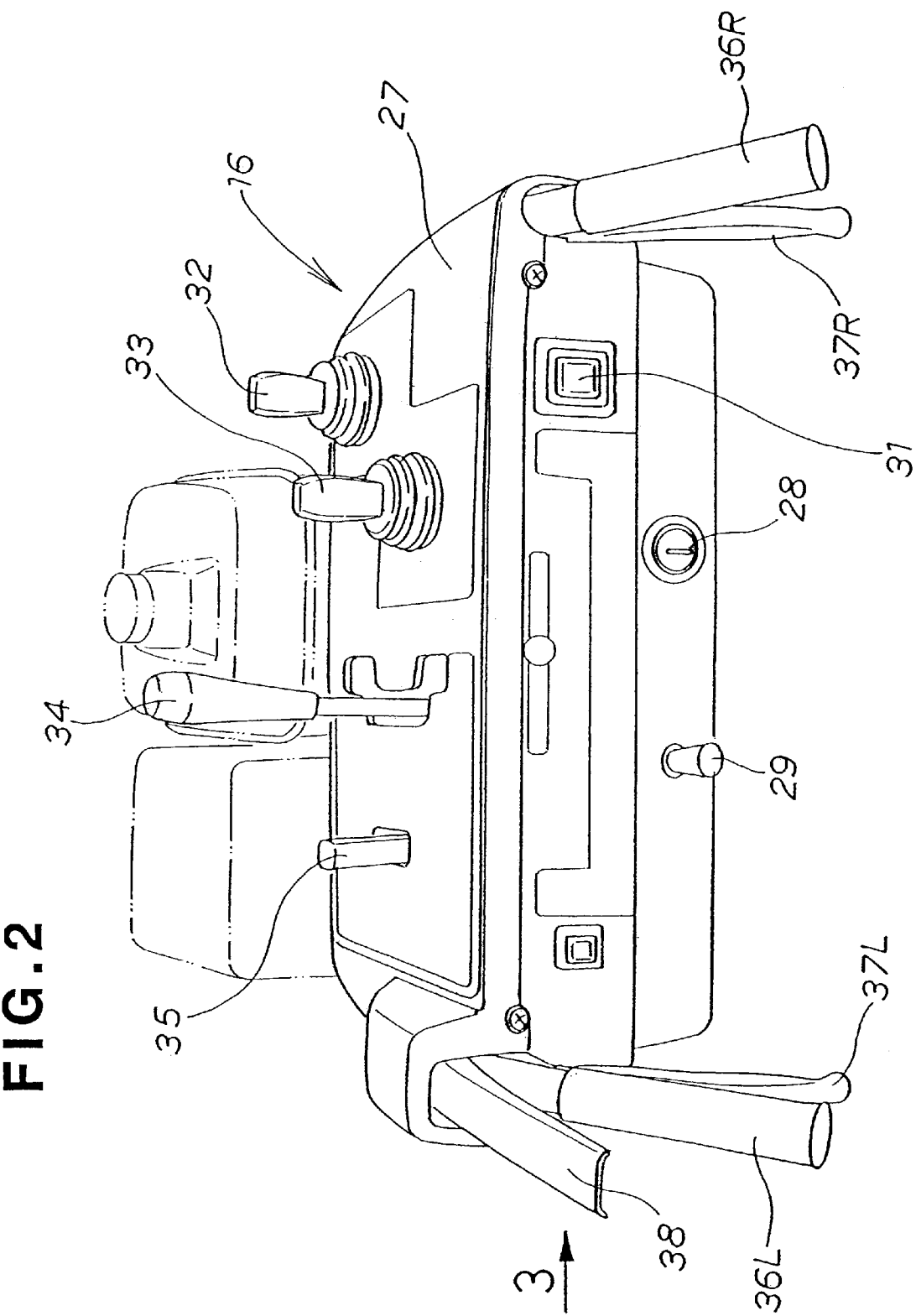
FIG. 2 is a view taken in the direction of arrow 2 in FIG. 1, illustrating a control section of the snow removal machine.

As shown in FIG. 2, the control panel 16 has, on the front surface of a control box 27 to face an operator, a main switch 28, an engine choke 29, a clutch control button 31 and other components. On the top surface of the control box 27, a snow throwing direction adjustment lever 32, an auger housing orientation adjustment lever 33, a directional speed lever 34 as a directional speed instructing member for the driving system, and an engine throttle lever 35 for the working system are provided. On the right of the control box 27, a grip 36R and a right turn control lever 37R are provided. On the left of the control box 27, a grip 36L, a left turn control lever 37L and a drive preparatory lever 38 are provided.

The left and right turn control levers 37L and 37R are similar to brake levers, but cannot provide complete braking effects as will be described below. The left and right turn control levers 37L and 37R are operated for reducing the rotational speed of the left and right electric motors 25L and 25R to turn the machine body. Therefore those components are not referred to as brake levers but turn control levers.

The main switch 28 is a known switch into which a main key is inserted and rotated for starting the engine. The engine choke 29 can be pulled to increase the density of air-fuel mixture. The snow throwing direction adjustment lever 32 is operated for changing the direction of the shooter 21 (See FIG. 1). The auger housing orientation adjustment lever 33 is operated for changing the orientation of the auger housing 22 (See FIG. 1).

Figure 3:
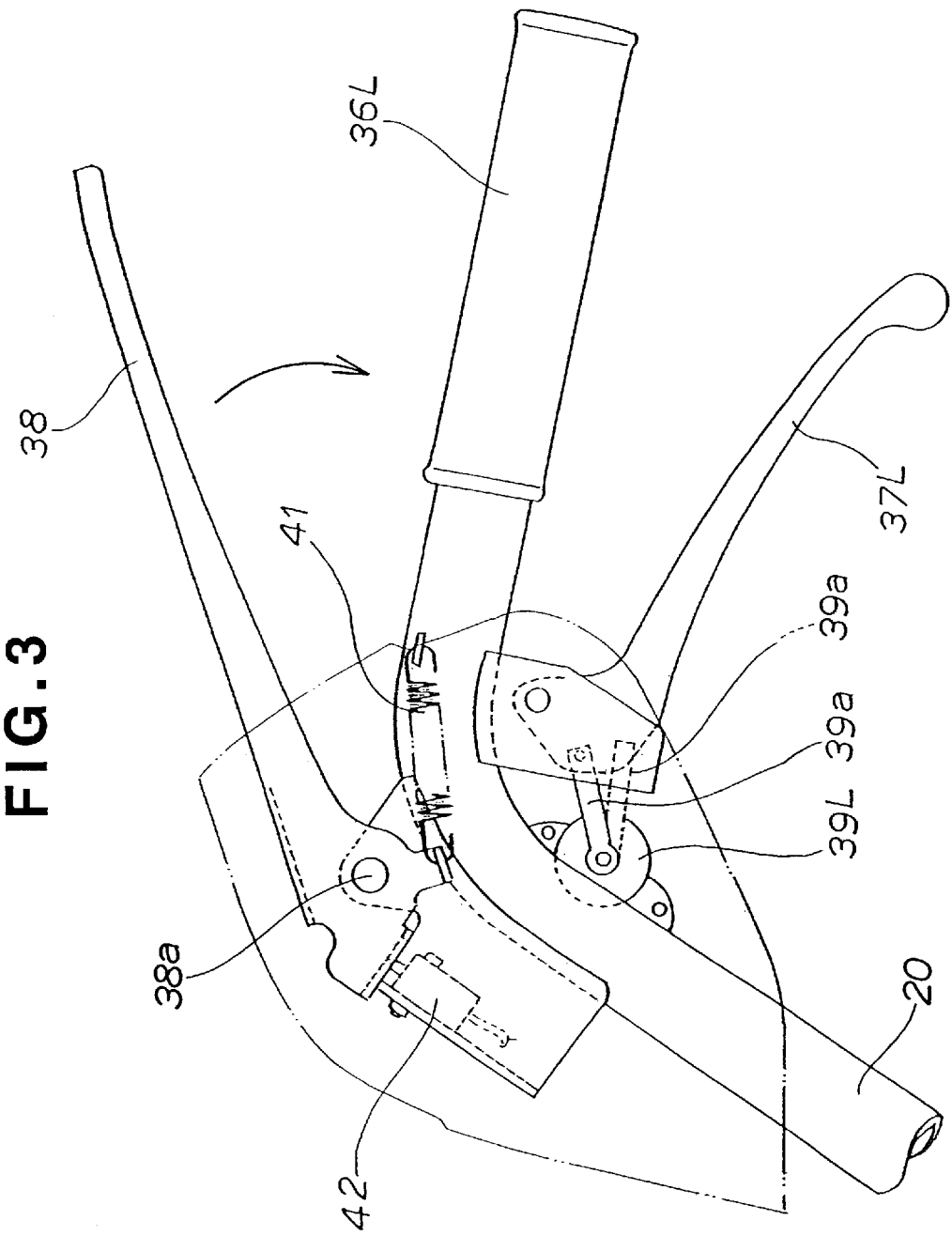
FIG. 3 is a view taken in the direction of arrow 3 in FIG. 2, illustrating a left turn control lever and a drive preparatory lever.

As shown in FIG. 3, handling the left turn control lever 37L can rotate an arm 39a of a potentiometer 39L at an angle to a position shown by imaginary lines. The potentiometer 39L produces electric information in accordance with the rotational position of the arm 39a.

The drive preparatory lever 38 is rotatable about a shaft 38a mounted to a handle 20 and is constantly biased by an extension spring 41 in a direction to turn a switch 42 off. Handling the drive preparatory lever 38 toward the left grip 36L by the left hand of the operator turns the switch 42 on. In short, handling the drive preparatory lever 38 turns the switch 42 from off to on. The switched ON signal is supplied to a controller 44 shown in FIG. 4. The controller 44 recognizes the completion of drive preparation upon receiving the ON signal.

Figure 4:
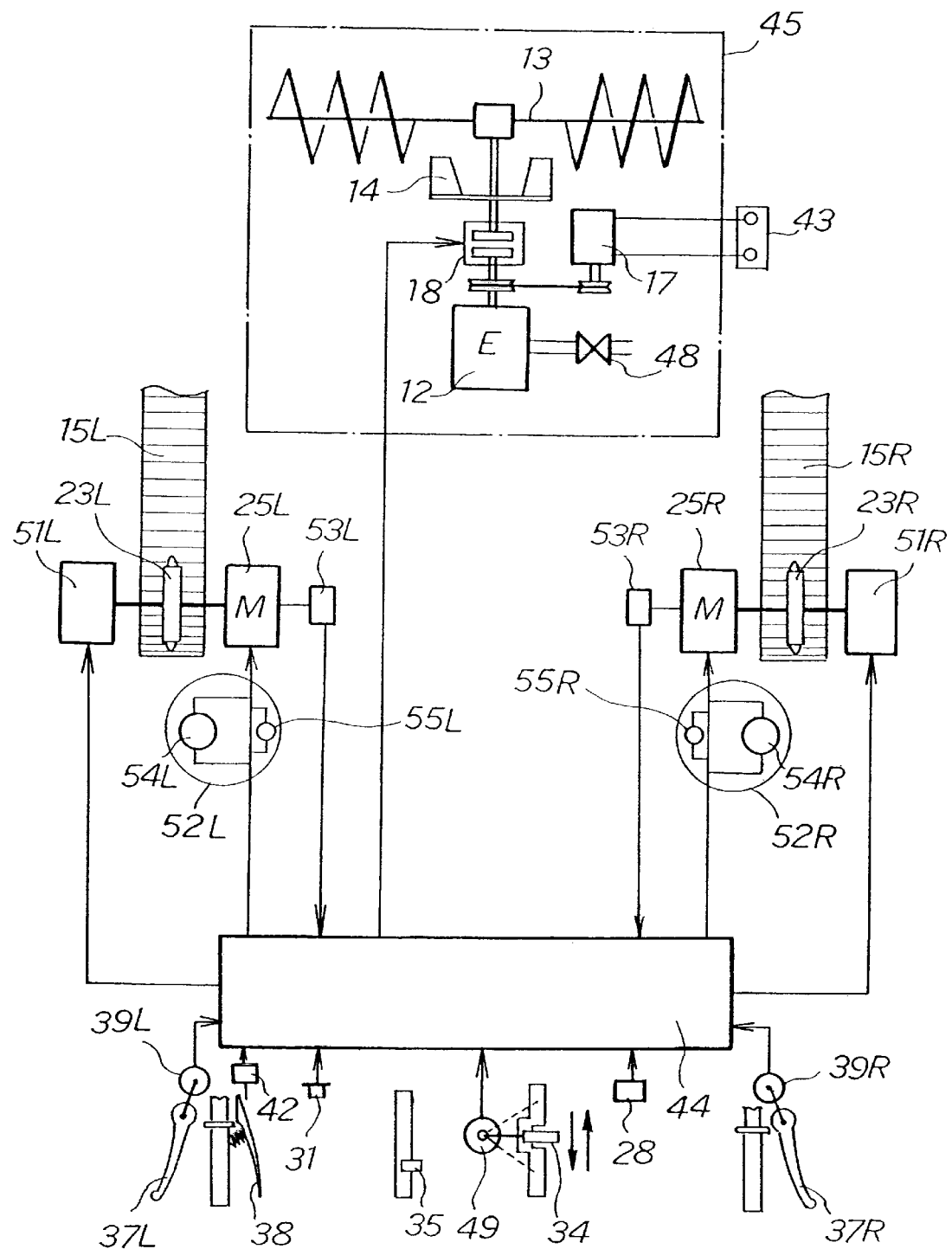
FIG. 4 is a control system diagram of the snow removal machine shown in FIG. 1.

FIG. 4 illustrates an electric system diagram of the snow removal machine according to the present invention. The controller 44 is provided in the control panel.

The engine 12 is started by rotation of a starter not shown connected to the battery 43 when the main switch 28 is turned on. The engine 12 drives the generator 17 for rotation, and the output power is supplied to the battery 43.

The engine throttle lever 35 is connected to a throttle valve 48 via a throttle wire (not shown). The engine throttle lever 35 is operated to adjust the opening of the throttle valve 48, adjusting the number of revolutions of the engine 12.

The drive preparatory lever 38 is handled to turn the switch 42 on. The ON signal is supplied to the controller 44. Handling the drive preparatory lever 38 allows the operation of the clutch control button 31. With this state, the clutch control button 31 is operated to bring the electromagnetic clutch 18 of the working system 45 into a connecting state, driving the blower 14 and the auger 13 for rotation. Either releasing the drive preparatory lever 38 or operating the clutch control button 31 for disconnection brings the electromagnetic clutch 18 into a disconnecting state.

The snow removal machine of this embodiment has left and right electromagnetic brakes 51L and 51R as brakes corresponding to parking brakes of a common vehicle. The electromagnetic brakes 51L and 51R are brought into a braking state when the directional speed lever 34 is put in a neutral region. When the main switch 28 is in an on state (start position) and the drive preparatory lever 38 is handled, in other words, when the two conditions are satisfied, switching the directional speed lever 34 to a forward position or a reverse position brings the electromagnetic brakes 51L and 51R into a released state (non-braking state), propelling the snow removal machine forward or backward.

Figure 5:
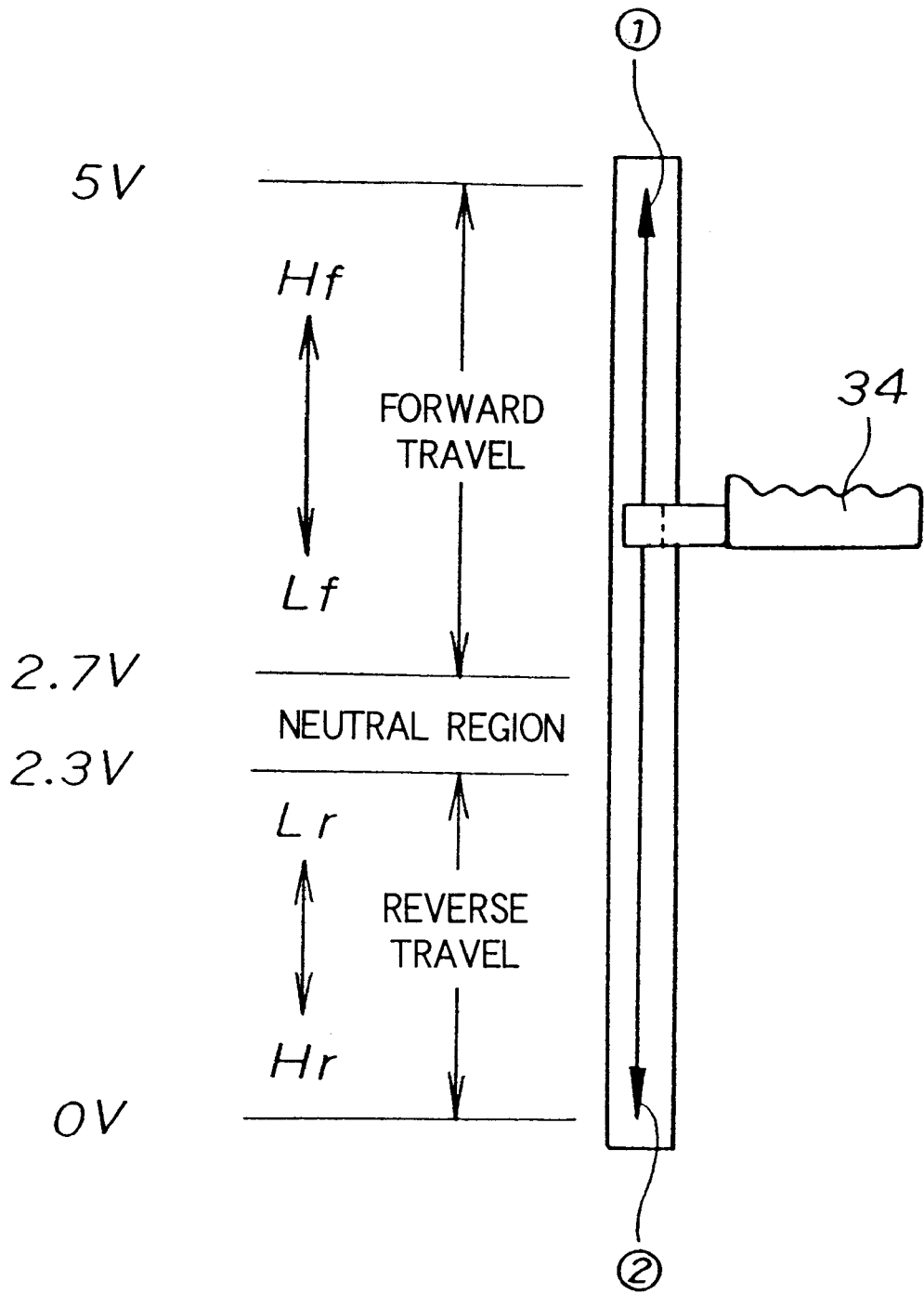
FIG. 5 is a diagram illustrating the operating range of a directional speed lever shown in FIG. 4.

The directional speed lever 34 is shown in detail in FIG. 5. From FIG. 5, the directional speed lever 34 is movable between a forward region, a neutral region and a reverse region. In the forward region, Lf indicates low-speed forward travel and Hf high-speed forward travel. The forward traveling speed is adjustable between Lf and Hf. Specifically, the directional speed lever 34 is operated to adjust the number of revolutions of the left and right electric motors 25L and 25R via the controller 44 and left and right motor drivers 52L and 52R shown in FIG. 4. In the reverse region, Lr indicates low-speed reverse travel and Hr high-speed reverse travel. Reverse traveling speed is controllable between low-speed reverse travel Lr and high-speed reverse travel Hr.

A potentiometer 49 shown in FIG. 4 is designed to generate, as shown in FIG. 5, a voltage of 0 volt at the highest speed in reverse travel, a voltage of 5 volts at the highest speed in forward travel, and a voltage from 2.3 to 2.7 volts in the neutral region.

The controller 44 receives the position information of the directional speed lever 34 from the potentiometer 49 and controls the rotation direction and the rotational speed of the left and right electric motors 25L and 25R via the left and right motor drivers 52L and 52R. The rotational speeds of the left and right electric motors 25L and 25R are detected by rotation sensors 53L and 53R and the detection signals are fed back to the controller 44. Based on the detection signals, the controller 44 controls the rotational speeds of the electric motors 25L and 25R to a predetermined value. As a result, the left and right driving wheels 23L and 23R rotate in a desired direction at a predetermined speed, propelling the vehicle.

Braking of the vehicle in travel is performed through the following steps. The motor drivers 52L and 52R of this embodiment include regenerative brake circuits 54L and 54R. In this embodiment, electrical switching changes the electric motors 25L and 25R to generators for power generation. Generating voltage higher than the battery voltage enables storing electric energy in the battery 43. This is the operating principle of regenerative brakes.

The left potentiometer 39L detects the degree of handling of the left turn control lever 37L. In response to a signal detected by the left potentiometer 39L, the controller 44 activates the left regenerative brake circuit 54L and reduces the rotational speed of the left electric motor 25L.

The right potentiometer 39R detects the degree of handling of the right turn control lever 37R. In response to a signal detected by the right potentiometer 39R, the controller 44 activates the right regenerative brake circuit 54R and reduces the rotational speed of the right electric motor 25R.

The snow removal machine is thus turned left by handling the left turn control lever 37L and is turned right by handling the right turn control lever 37R.

Any of the following operations stops the travel of the snow removal machine.

i) Return the directional speed lever 34 to the neutral position.

ii) Release the drive preparatory lever 38.

iii) Return the main switch 28 to the off position.

Short-circuiting brake circuits 55L and 55R are used for the stopping. The left short-circuiting brake circuit 55L short-circuits the two poles of the electric motor 25L. The short circuit brings the electric motor into a suddenly braked state. The right short-circuiting brake circuit 55R operates the same.

Returning the main switch 28 to the off position after the snow removal machine stops traveling activates the electromagnetic brakes 51L and 51R to apply the parking brakes.

Now driving of the electric motors used in this embodiment will be described with reference to FIGS. 6A and 6B.

Figures 6A, 6B:
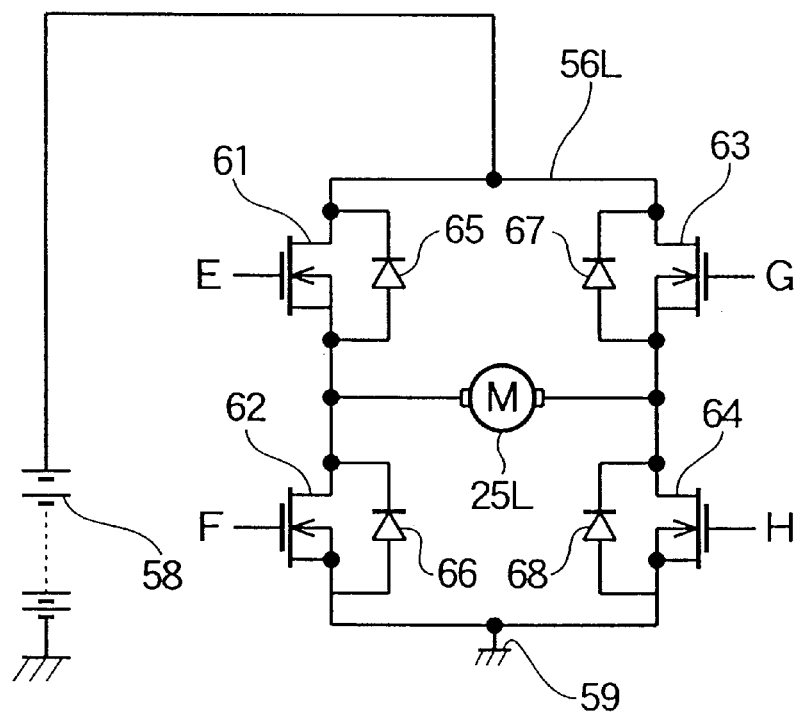
FIGS. 6A and 6B are, respectively, an electric motor drive circuit according to the present invention and a mode table.

In FIG. 6A, a high frame of a drive circuit 56L of the electric motor 25L (an upper half of the circuit) is connected to a power source 58. A low frame (a lower half of the circuit) is connected to a ground 59. In a left high frame and a left low frame, an E driving element 61 and an F driving element 62 are disposed, respectively. In a right high frame and a right low frame, a G driving element 63 and an H driving element 64 are disposed, respectively. Diodes 65 to 68 are connected in parallel with the E to H driving elements 61 to 64, functioning as bypass circuits. The E to H driving elements 61 to 64 are switched on and off in response to control signals.

Field effect transistors (FET) are suitable for the E to H driving elements 61 to 64. Ordinary transistors are low-impedance devices activated by current while FETs are high-impedance devices activated by voltage. Because of their high impedance, FETs are generally suitable for being interposed in the circuit 56L as shown in the figure. However, FETs have such disadvantages as operating slowly as compared with other electronic components and requiring long operating time. Time equivalent to the operating time is herein referred to as t2. The time t2 will be described below.

FIG. 6B is a mode table for the electric motor drive circuits, illustrating mode names on the left and the ON or OFF states of the E to H driving elements on the right.

In a short circuit brake mode, the F and H driving elements are turned ON and the E and G driving elements are turned OFF. In FIG. 6A, the power source 58 is isolated from the electric motor 25L to form a short circuit in the low frame. A sudden brake is thus applied to the electric motor 25L. This state is referred to as a short circuit brake.

In a forward mode, the E and H driving elements are turned ON and the F and G driving elements are turned OFF. In FIG. 6A, a current flows through the E driving element, the electric motor 25L and the H driving element 64 in this order, forwardly rotating the electric motor 25L. In a reverse mode, the opposite conditions reversely rotate the electric motor 25L.

In a free mode, the E to H driving elements are all turned OFF. No current flow through the electric motor allows its idle rotation.

Figure 8:
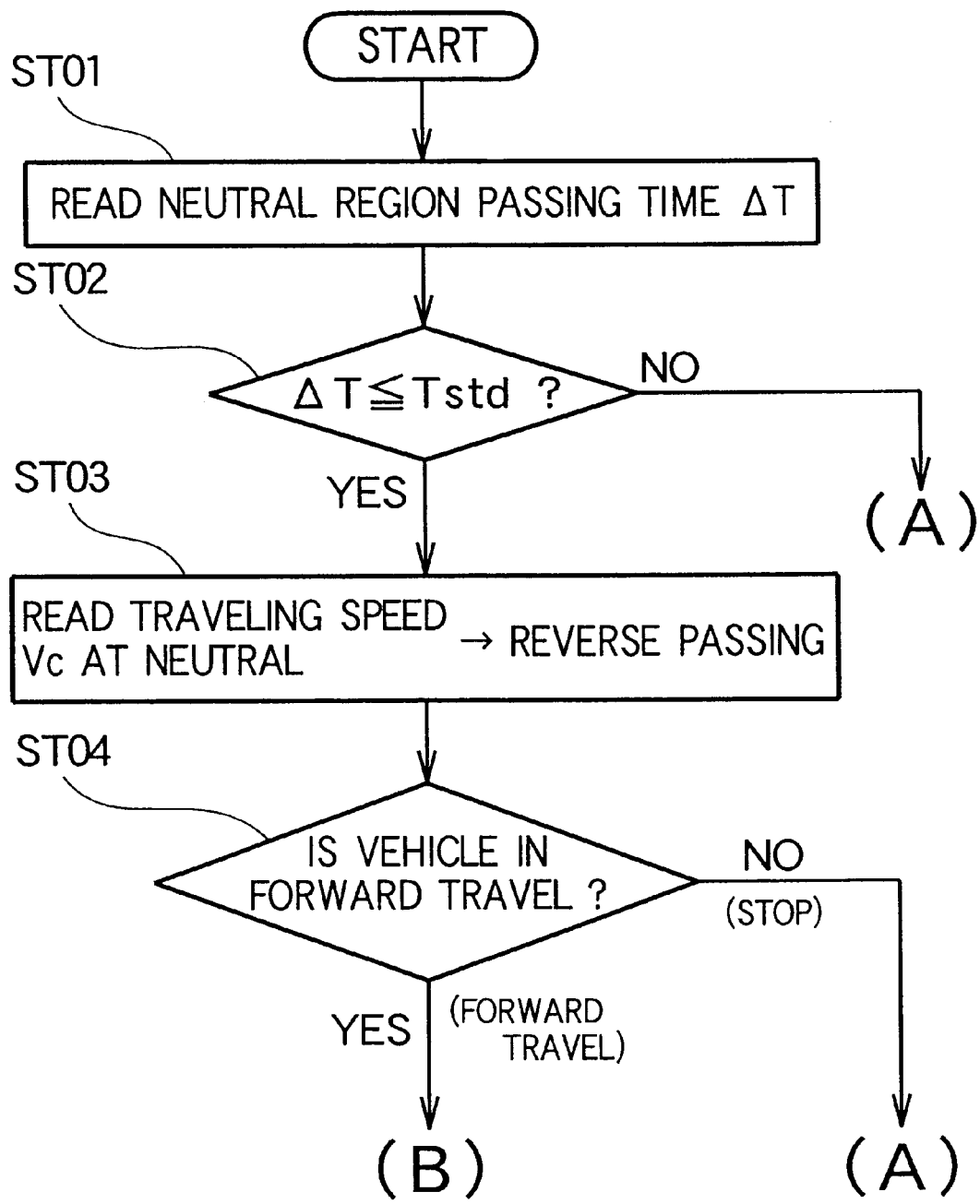
FIG. 8 is a flowchart corresponding to FIGS. 7(a) to 7(f), of determining whether or not the directional speed lever is switched at a high speed.

Now determination whether the directional speed member is switched at a "normal" speed or a "high speed" will be first described with FIGS. 7 and 8. Normal operation control at the "normal" speed switching will be described with FIGS. 9 and 10. Operation control of the present invention at the "high speed" switching will be described with FIGS. 11 and 12.

FIGS. 7(a) to 7(f) are graphs illustrating the relationship between the directional speed lever of this embodiment and traveling speed. All of the horizontal axes are time axes. FIGS. 7(a) and 7(b) correspond to shifting of the directional speed lever at the "normal" speed. FIGS. 7(c) to 7(f) correspond to shifting of the directional speed lever at the "high speed."

In FIG. 7(a), the vertical axis indicates positions of the directional speed lever, showing shifting of the directional speed lever in a forward position from a point P1 to a reverse position at a relatively low speed.

In FIG. 7(b), the vertical axis indicates traveling speed which almost precisely follows' the positional change of the directional speed lever as being gradually reduced from a point P2.

FIG. 7(c) illustrates switching of the directional speed lever in a forward high-speed position to a reverse high-speed position at a high speed, showing the lever's getting into the neutral region at a point P3 and getting out of the neutral region at a point P4.

FIG. 7(d) illustrates traveling speed corresponding to FIG. 7(c), showing that the traveling speed starts declining at P2 but the effect of an inertial force due to the vehicle mass causes a point P5 where the traveling speed becomes zero to be behind P4 (equal to P4 in FIG. 7(c)). Between P4 and P5, the directional speed lever is in the reverse region but the electric motors are still in forward rotation. Under this state, reversing the rotation of the electric motors must be avoided; otherwise electrical overload will occur.

In FIG. 7(c), time $\Delta T$ from P3 to P4 is a period of time required for the directional speed lever to pass through the neutral region. When the time $\Delta T$ is within a threshold Tstd (this value is used in the next figure), it is determinable that the directional speed lever is shifted from forward travel to reverse travel at a "high speed."

FIG. 7(e) illustrates switching of the directional speed lever in a forward low-speed position to a reverse low-speed position at a high speed.

FIG. 7(f) illustrates traveling speed corresponding to FIG. 7(e), in which the traveling speed becomes zero at a point P7. In this example, an inertial force is small because speed reduction is started from a low speed and the speed is immediately becomes zero without much receiving the effect of the inertial force. P7 is ahead of a point P6 (in FIG.

7(e), showing shifting from the neutral region to the reverse region). This is completely different from the state in FIG. 7(d). Specifically, at P6 in FIG. 7(f), the traveling speed is already zero. Starting reverse travel at P6 is thus not harmful, causing no electrical overload.

FIG. 8 illustrates an operation control flowchart corresponding to FIG. 7.

In step (hereinafter abbreviated as ST) 01, read neutral region passing time $\Delta T$ (See FIGS. 7(a) and 7(c)).

In ST02, determine whether or not the neutral region passing time $\Delta T$ is equal to or lower than the threshold Tstd. When the answer is NO, the speed is assumed to be "normal," and proceed to ST11 in FIG. 10. When YES, proceed to ST03.

In ST03, read a traveling speed Vc of the electric vehicle during shifting from the neutral region to the reverse region. Specifically, read signals from the rotation sensors 53L and 53R shown in FIG. 4.

In ST04, determine whether or not the vehicle is still in forward travel. Specifically, when Vc is not zero and the rotation direction of the electric motors is forward, the vehicle is assumed to be in forward travel. When NO, determine that it is allowable to shift to normal operation for the reason described with FIG. 7(f), and proceed to ST11 shown in FIG. 10. When YES, proceed to ST31 shown in FIG. 12.

FIGS. 9(a) to 9(e) are time charts illustrating normal starting control of this embodiment, in which the horizontal axes are time axes.

Figure 9A:
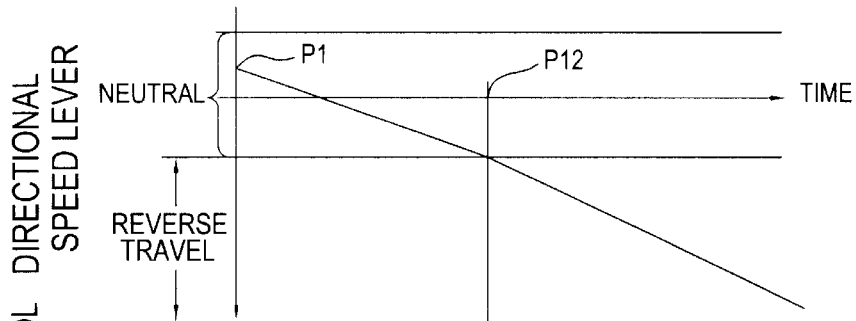
FIGS. 9(a) to 9(e) are time charts illustrating normal starting control of the present invention.

In FIG. 9(a), the vertical axis indicates positions of the directional speed lever. Manual shifting of the directional speed lever in the neutral region (the lever may have been shifted from the forward region to the neutral region) to the reverse region is started at a point P1 on the horizontal axis. At a point P12 on the horizontal axis, the lever passes the boundary (See 2.3V in FIG. 5) between the neutral region and the forward region. Thereafter the directional speed lever is continuously shifted.

Figure 9B:
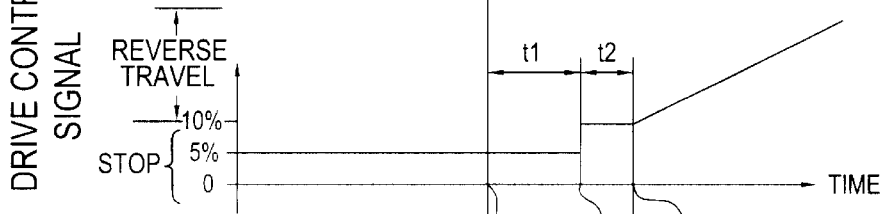

In FIG. 9(b), the vertical axis indicates a drive control signal to the electric motors. The drive control signal is a PI drive control signal in proportional-plus-integral (PI) control and is a PID drive control signal in proportional-plus-integral-plus-derivative (PID) control. In this embodiment, drive control is performed in a range from 10% to 90% of the full scale of 100% with the lowermost 10% and the uppermost 10% cut. Since the directional speed lever is in the neutral region before P12 in FIG. 9(a), the drive control signal in FIG. 9(b) is set at 5%, less than 10%. Although the drive control signal may be 0, setting it at 5% is useful for detecting failure such as breaking of wire. Specifically, it becomes possible to recognize a normal state at 5% and braking of wire at less than 5%.

In FIG. 9(b), the drive control signal is increased to 10% at a point P13 at which time t1 has elapsed since P12. The time t1 is releasing-required time between the start of release of the electromagnetic brakes and the completion of the release. Measurements of the time required to switch the electromagnetic brakes from the braking state to the released state vary because of variations in their mechanical components. A value artificially determined based on an average value of the measured values is used as the time t1. Time t2 is determined in the same manner.

The time t1 depending on the size and structure of the electromagnetic brakes is set at about several milliseconds to dozens of milliseconds. The time t2 is similarly set at about several milliseconds to dozens of milliseconds.

In FIG. 9(b), the drive control signal is turned to increase at a point P14 at which the time t2 has elapsed since P13. It seems good to increase the drive control signal to 10% or more in FIG. 9(b) immediately after the directional speed lever reaches P12, going beyond the neutral region in FIG. 9(a). This embodiment, however, provides waiting time (t1+t2) on purpose.

Figure 9C:
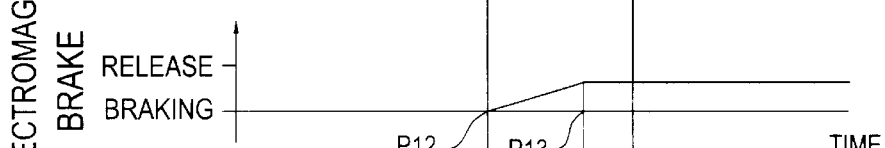

FIG. 9(c) illustrates the operating state of the electromagnetic brakes. Up to P12, since the directional speed lever in FIG. 9(a) is in the neutral region, the electromagnetic brakes are in the braking state at a command from the controller. At P12, the controller starts releasing the electromagnetic brakes, providing an upward slope of the curve toward releasing. At P13, the electromagnetic brakes complete the releasing. The time between P12 and P13 thus agrees to the time t1 required to release the electromagnetic brakes.

Figure 9D:
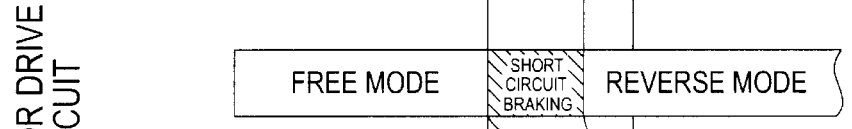

FIG. 9(d) is a diagram illustrating mode variation of the motor drive circuits. Up to P12, the motor drive circuits are in the free mode (See FIG. 6B) at a command from the controller. In the free mode, the electric motors are idly rotatable. From P12 to P13, the motors are in the short circuit brake mode (See FIG. 6B) at a command from the controller. In FIG. 9(c), since the electromagnetic brakes are released between P12 and P13, the short circuit brakes are applied instead. This brings the electric motors into the braked state.

Figure 9E:
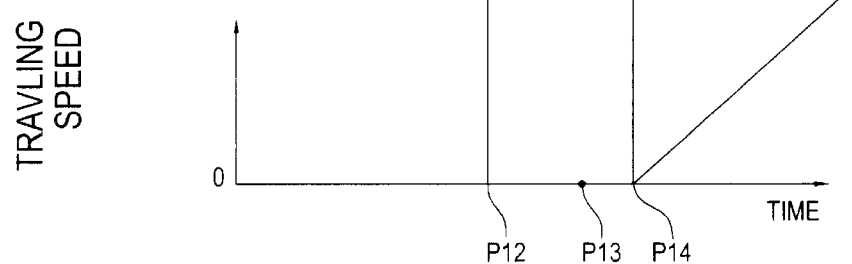

In FIG. 9(e), the vertical axis indicates the traveling speed of the vehicle. At the point (P14) in FIG. 9(b) where the drive control signal exceeds 10%, the traveling speed in FIG. 9(e) exceeds 0 and the vehicle is in a traveling state.

In this example, the provision of the time t1 can prevent an occurrence of such an inconvenience that the electric motors are brought into an operating state while the electromagnetic brakes are in the braking state. This prevents brake drag, extending the life of the electromagnetic brakes.

Further, the provision of the time t2 enables gaining time during which the motors are brought into actual rotation from the short circuit brake mode. This allows a reduction in electrical load applied to the driving elements 61 to 64 shown in FIG. 6A, extending the life or reducing the size of the driving elements 61 to 64.

Another point is that in FIG. 9(e), since the drive control signal to the electric motors is 5% between P12 and P13 (See FIG. 9(b)), the electric motors do not produce torque although being in the short circuit braked state. Between P13 and P14, the drive control signal to the electric motors is 10% (See FIG. 9(b)) and the circuits are in the forward mode, so that small torque just before starting is produced. Between P13 and P14, a force against the external force (small torque insufficient for travel) is thus generated by the electric motors in place of the short circuit brakes. As a result, the vehicle is prevented from rolling back on a grade also between P13 and P14.

Figure 10:
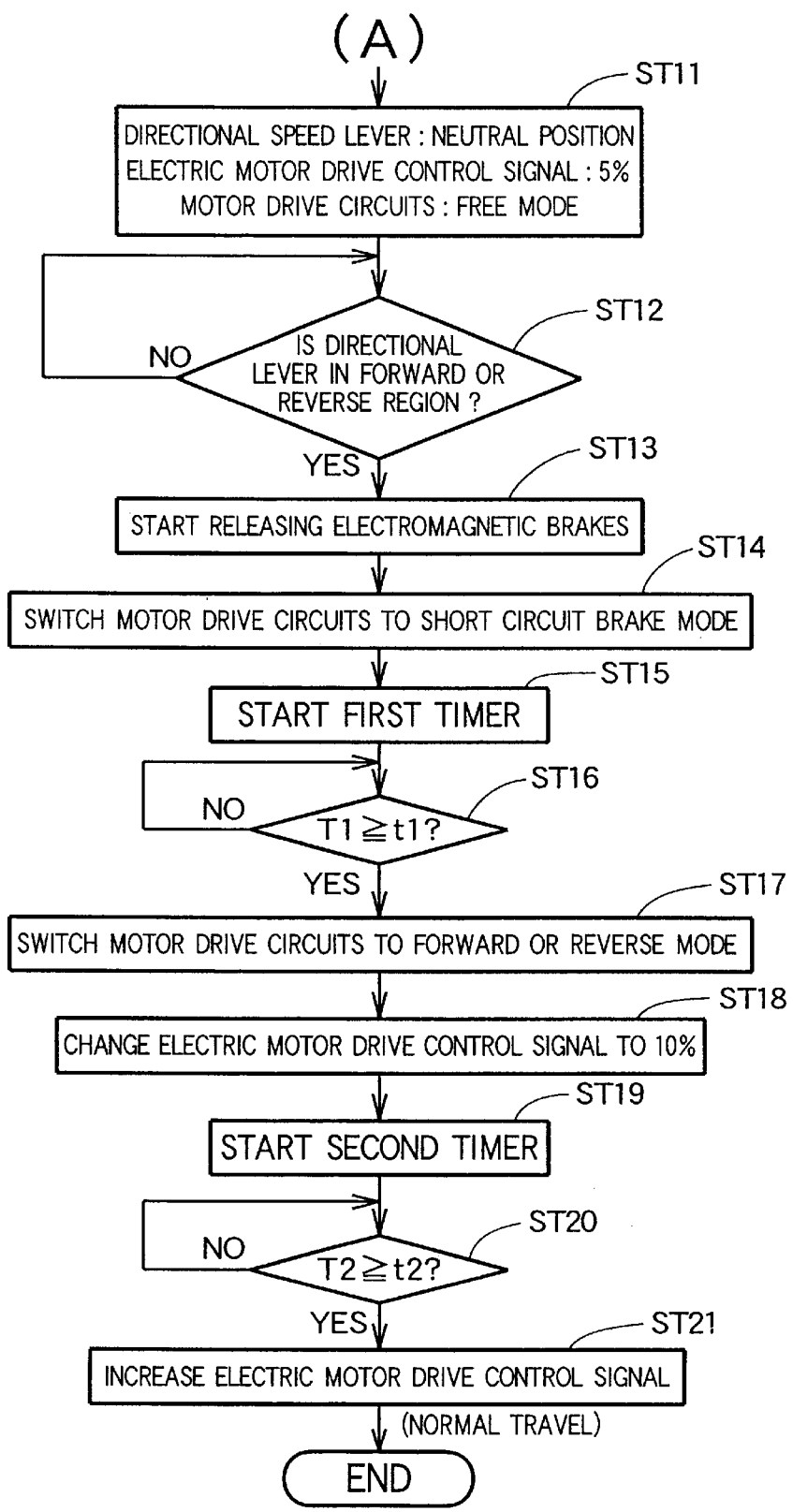
FIG. 10 is a control flowchart corresponding to FIGS. 9(a) to 9(e)

FIG. 10 is an operation control flowchart corresponding to FIG. 9.

ST11: Settings at this point of time are listed. Specifically, it is assumed that the directional speed lever is in the neutral position, the electric motor drive control signal is 5% (See FIG. 9(b)) and the motor drive circuits are in the free mode (See FIG. 6B).

ST12: Check whether or not the directional speed lever 34 shown in FIG. 4 is in the reverse region (or in the forward region). When the answer is YES, proceed to ST13.

ST13: When the lever is in the forward or reverse region, the controller starts releasing the electromagnetic brakes 51L and 51R shown in FIG. 4. The electromagnetic brakes require a certain period of time to complete the release.

ST14: The controller simultaneously switches the motor drive circuits to the short circuit brake mode (See FIG. 6B).

ST15: Start a first timer incorporated in the controller.

ST16: Check whether or not time T1 counted by the first timer reaches the time t1 required to release the electromagnetic brakes. When its reaching is found, proceed to ST17.

ST17: The controller switches the motor drive circuits to the reverse mode (or to the forward mode) in accordance with the directional speed lever.

ST18: The controller simultaneously changes the drive control signal to the electric motors to 10% (See P13 in FIG. 9(b)).

ST19: Start a second timer incorporated in the controller.

ST20: Check whether or not time T2 counted by the second timer reaches the time t2 required to release the short circuit brakes. When the time T2 reaches the time t2, proceed to ST21.

ST21: The controller increases the drive control signal to the electric motors in accordance with the position of the directional speed lever (after P14 in FIG. 9(b)). This causes the vehicle to start traveling.

FIGS. 11(a) to 11(e) are time charts illustrating starting control at high-speed switching of the directional speed lever according to this embodiment, in which the horizontal axes are time axes.

Figure 11A:
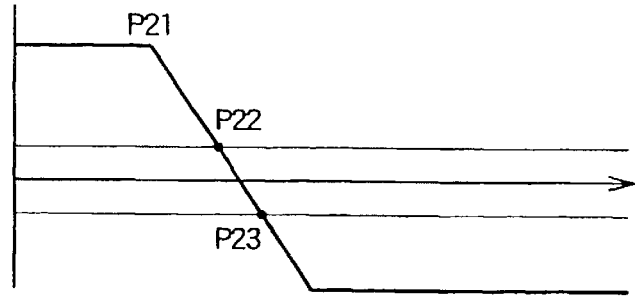
FIGS. 11(a) to 11(e) are time charts illustrating starting control at high-speed switching of the directional speed lever.

In FIG. 11(a), the vertical axis indicates positions of the directional speed lever, showing shifting of the directional speed lever in the forward region to the reverse region at a high speed. The directional speed lever starts moving toward the neutral region at a point P21, enters the neutral region at a point P22 and moves out of the neutral region at a point P23.

Figure 11B:
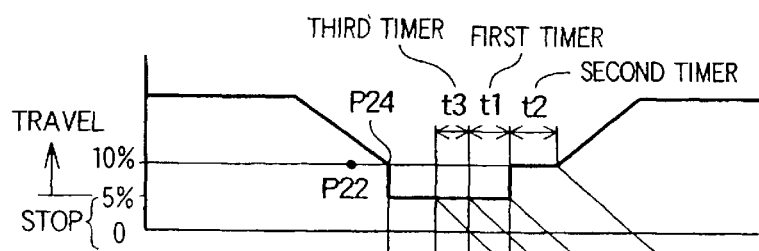

In FIG. 11(b), the vertical axis indicates a drive control signal to the electric motors, showing that high-speed shifting of the directional speed lever causes delay in signal-output reducing processing and the signal reaches 10% at a point P24 behind P22 and then is immediately reduced to 5%.

Figure 11C:
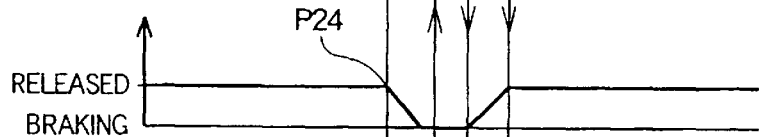

FIG. 11(c) illustrates the operating state of the electromagnetic brakes which are switched from releasing to braking with timing corresponding to P24 in FIG. 11(b). The switching, however, takes time.

Figure 11D:
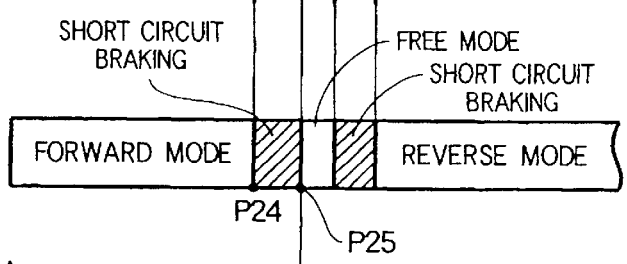

FIG. 11(d) illustrates the modes of the motor drive circuits. The motor drive circuits in the forward mode are switched to the short circuit brake mode at P24. This processing is for complementing the releasing of the electromagnetic brakes in FIG. 11(c).

Figure 11E:
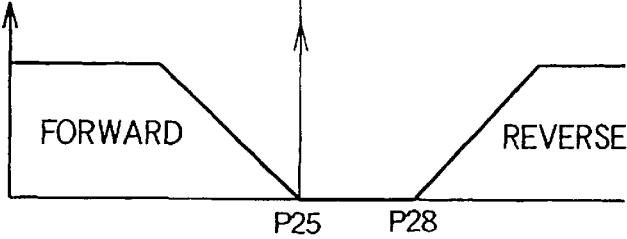

FIG. 11(e) illustrates traveling speed, in which the high-speed shifting of the directional speed lever causes delay in stopping the vehicle and the speed of the electric motors does not become zero until a point P25. P25 is behind P23 in FIG. 11(a). At the point of time of P25, the motor drive circuits are switched to the free mode in FIG. 11(d) and a third timer is started to wait a lapse of time t3 in FIG. 11(b). The time t3 is a period of time required to switch the motor circuits from forward rotation to reverse rotation, being set at several milliseconds to dozens of milliseconds.

In FIG. 11(b), the first timer is started at a point P26 at which the time t3 has elapsed. In FIG. 11(c), release of the electromagnetic brakes is simultaneously started. In FIG. 11(d), the motor drive circuits are switched to the short circuit brake mode. In FIG. 11(b), the second timer is started at a point P27 at which the time t1 has elapsed and the control signal output is simultaneously increased to 10%. As shown in FIG. 11(d), the motor drive circuits are switched to the reverse mode.

Further in FIG. 11(b), the drive control signal is increased over 10% at a point P28 at which the time t2 has elapsed. That is, the drive control signal is increased to a level corresponding to the position of the directional speed lever. As a result, the vehicle starts traveling rearward as shown in FIG. 11(e).

Figure 12:
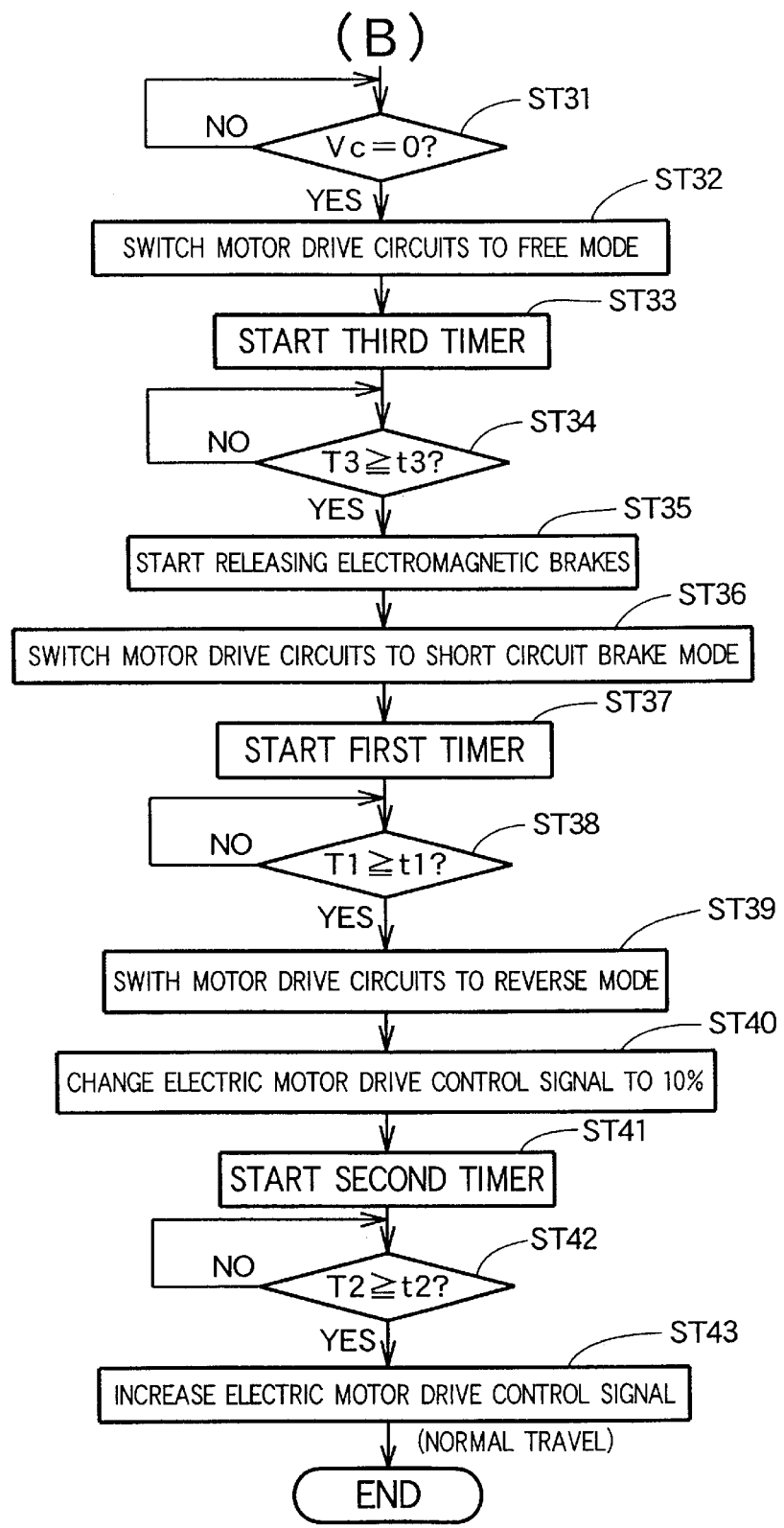
FIG. 12 is a control flowchart corresponding to FIG. 11.

FIG. 12 is a control flowchart corresponding to FIG. 11.

ST31: Wait until the traveling speed Vc becomes zero. With YES, proceed to the next. This timing corresponds to P25 in FIG. 11(e).

ST32: Switch the motor drive circuits to the free mode. The free mode turns off all of the driving elements in the circuits, which is equal to resetting. Switching the driving elements thereafter to the reverse mode will not cause application of electrical overload to the driving elements.

ST33: Start the third timer incorporated in the controller.

ST34: Check whether or not the time T3 counted by the third timer reaches the driving element switching time t3. When the time T3 counted by the third timer reaches the driving element switching time t3, proceed to ST35.

ST35: When the time T3 counted by the third timer reaches the driving element switching time t3, releasing of the electromagnetic brakes 51L and 51R shown in FIG. 4 is started. The electromagnetic brakes, however, require some time to complete the releasing.

ST36: The motor drive circuits are switched to the short circuit brake mode (See FIG. 6B) simultaneously with the start of release of the electromagnetic brakes 51L and 51R.

ST37: Start the first timer incorporated in the controller.

ST38: Determine whether or not the time T1 counted by the first timer reaches the time t1 required to release the electromagnetic brakes. When its reaching is found, proceed to ST39.

ST39: Switch the motor drive circuits to the reverse mode.

ST40: The drive control signal to the electric motors is changed to 10% as shown in FIG. 11(b) simultaneously with the switching to the reverse mode.

ST41: Start the second timer incorporated in the controller.

ST42: Determine whether or not the time T2 counted by the second timer reaches the time t2 required to release the short circuit brakes. When its reaching is found, proceed to ST43.

ST43: The drive control signal to the electric motors is increased in accordance with the position of the directional speed lever. This causes the vehicle to start traveling.

As described above, this embodiment provides an electric vehicle of a type of controlling forward travel, neutral and reverse travel of the vehicle driven by electric motors by a single directional speed member, the electric vehicle including a controller for such control as verifying that a time period required for the directional speed member to pass through the neutral region is shorter than a threshold (ST02 in FIG. 8), verifying that the electric motors are still rotating in a forward direction at the point of time when the directional speed member is shifted from a neutral region to a reverse region (ST04 in FIG. 8), waiting until the speed of the electric motors becomes zero when the above two conditions are satisfied (ST31 in FIG. 12), waiting a lapse of time t3 required for forward/reverse switching of the motor drive circuits after the speed of the electric motors reaches zero (ST34 in FIG. 12), and thereafter shifting to normal reverse operation control (ST35 and the following in FIG. 12).

The electric vehicle of the present invention is not limited to the snow removal machine shown in the embodiment, and may be of any kind as long as being an electric vehicle such as an electric carrier or an electric caddie cart.

The snow removal machine in the present embodiment has left and right electric motors. An electric vehicle of this invention may be of a type having a single electric motor for driving left and right driving wheels.

The present embodiment has the single directional speed lever. Several directional speed levers may be provided to share the functions. The directional speed control member may be a lever, a dial, a switch or an equivalent.

The present disclosure relates to the subject matter of Japanese Patent Application No. 2001-355328, filed Nov. 20, 2001, the disclosure of which is incorporated herein by reference in its entirety.

What is claimed is:

1. An electric vehicle driven by electric motors, comprising:

a directional speed member for instructing forward travel, neutral and reverse travel of said vehicle and adjusting the speed of said vehicle;

said electric motors which operate in accordance with the operation of said directional speed member; and a controller for performing such control as, when two conditions are satisfied that time required for said directional speed member to pass through a neutral region is shorter than a threshold and said electric motors are still rotating in a forward direction at a point of time when said directional speed member is shifted from said neutral region to a reverse region, waiting until the speed of said electric motors becomes zero, and, after a lapse of time required for forward/reverse switching of said motor drive circuits since the speed of said electric motors reaches zero, shifting to normal reverse operation.

* * * * *